United States Patent [19]

Hoag

[11] Patent Number: 5,353,843

[45] Date of Patent: Oct. 11, 1994

[54] METHOD AND APPARATUS FOR PROTECTING A HOSE

[75] Inventor: Robert L. Hoag, Grand Rapids, Mich.

[73] Assignee: Crown Industries, Inc., Grand Rapids, Mich.

[21] Appl. No.: 988,748

[22] Filed: Dec. 10, 1992

[51] Int. Cl.⁵ .............................................. F16L 11/00
[52] U.S. Cl. .................... 138/110; 138/103; 138/104; 138/109; 138/120; 138/178
[58] Field of Search ............... 138/103, 104, 109, 110, 138/120, 155, 148, 98, 178; 137/375, 377

[56] References Cited

U.S. PATENT DOCUMENTS

| | | | |
|---|---|---|---|
| 267,473 | 11/1882 | Westinghouse | 138/110 |
| 276,472 | 4/1883 | Rittenhouse et al. | 138/120 |
| 338,310 | 3/1886 | Smith | 138/110 |
| 428,023 | 5/1890 | Schoff | 138/120 |
| 1,276,117 | 8/1918 | Riebe | 138/120 |
| 1,746,719 | 2/1930 | Sneed | 138/120 |
| 1,905,824 | 4/1933 | Dysthe | 138/120 |
| 2,614,585 | 10/1952 | Wagstaff | 138/155 |
| 3,815,641 | 6/1974 | Simpson | 138/155 |
| 4,716,604 | 1/1988 | Watkins | 138/110 |
| 4,807,370 | 2/1989 | Trimble | 138/155 |
| 4,995,427 | 2/1991 | Berchem | 138/155 |
| 5,044,404 | 9/1991 | Watson | 138/104 |
| 5,046,764 | 9/1991 | Kimura et al. | 138/120 |
| 5,134,251 | 7/1992 | Martin | 138/155 |
| 5,143,123 | 9/1992 | Richards et al. | 138/120 |

FOREIGN PATENT DOCUMENTS

| | | | |
|---|---|---|---|
| 1212370 | 3/1966 | Fed. Rep. of Germany | 138/120 |
| 339757 | 6/1904 | France | 138/120 |
| 1098836 | 4/1955 | France | 138/120 |
| 70274 | 3/1959 | France | 138/110 |
| 530667 | 12/1940 | United Kingdom | 138/110 |
| 1327659 | 8/1973 | United Kingdom | 138/110 |

Primary Examiner—James E. Bryant, III
Attorney, Agent, or Firm—Waters & Morse

[57] ABSTRACT

A hose jacket for protecting a flexible resilient fluid conveying hose from external damage comprises a plurality of tubular segments formed of a synthetic resin that fit over the hose in end-to-end fashion with the segments having internal and external tapered surfaces at opposite ends, with the internal tapered surface of one segment mating with the external tapered surface of the adjacent segment so as to facilitate articulation of the hose and hose jacket while limiting gaps between the adjoining hose jacket segments. Connector fittings on the hose retain the hose jacket on the hose. A compression spring between the hose jacket and the hose fitting can be used for resiliently urging the segments together.

14 Claims, 1 Drawing Sheet

U.S. Patent    Oct. 11, 1994    5,353,843
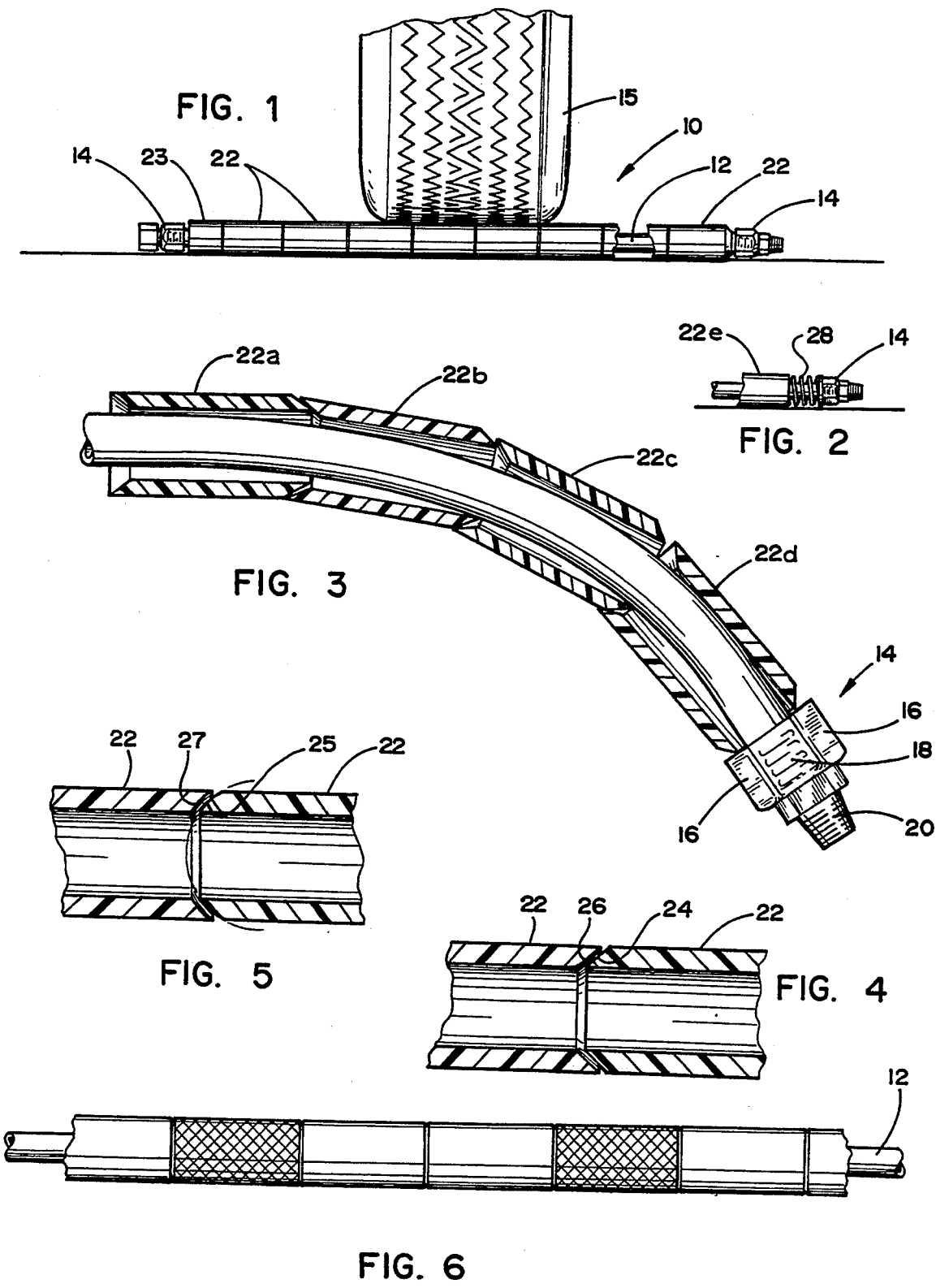

METHOD AND APPARATUS FOR PROTECTING A HOSE

BACKGROUND OF THE INVENTION

The present invention relates to a fluid conveying hose having a protective jacket mounted thereon and a method for protecting the hose with the jacket, wherein the jacket protects the hose from crushing or puncture and is easily articulated without significantly limiting the protection provided by the hose jacket.

Fluid conveying hoses are used for a number of applications in industrial and commercial applications. Such hoses can convey air, acetylene, hydraulic fluid, or oxygen. Hoses are typically formed of a flexible rubber material but can be formed of other materials as well. Fluid hoses are designed to withstand internal pressures created by pressurized gas or liquids but typically are not resistant to externally applied forces that may crush or puncture the hose. A common problem with gas or liquid hoses is that they frequently are subjected to being crushed and damaged by forklift trucks or the like that run over the hoses in an industrial establishment.

Protective casings or jackets have been developed for various purposes. In Sakuragi, et al, U.S. Pat. No. 4,396,797, a flexible hollow cable having a specifically limited bending ability is designed to house a signal or power transmission line or a liquid or gas conduit in order to limit bending of the cable or hose to prevent loss of function or damage to the cable or hose through sharp bending or crimping. Dysthe, U.S. Pat. No. 1,905,824, discloses a jointed metallic hose casing that is designed to fit tightly over a rubber hose in order to reinforce the hose against high internal pressures. Kimura, et al, U.S. Pat. No. 4,739,801 discloses a supporting sheath for electrical cables formed of interconnected links that make it possible to bend the cable so it is held in a fixed position by the sheath.

A prior hose jacket developed by applicant's predecessor for protecting hoses comprises separate tubular segments having squared or flat ends with rubber washers glued to the ends for limiting infiltration of sand and the like inside the hose jacket. These rubber washers had a tendency to break off, and the segments did not interfit, which impaired articulation for tighter spacer segments and produced larger than desirable Gaps when articulated.

An object of the present invention is to provide an improved hose jacket and method for protecting a hose.

SUMMARY OF THE INVENTION

In accordance with the present invention, a hose jacket for protecting a flexible resilient fluid conveying hose from external damage of crushing comprises a plurality of tubular segments of Generally uniform diameter that fit over the hose in end-to-end alignment, with the tubular segments being formed of a tough, crush-resistant material that restrains the hose from damage when a forklift truck or the like drives over the hose jacket. The tubular segments are retained in closely spaced relationship on the hose by fixed position fittings on the hose at opposite ends of the hose jacket. The tubular segments have an external beveled surface at one end and an internal beveled surface at the opposite end. The segments are positioned on the hose so that the external beveled surface on one segment abuts an internal beveled surface on the adjoining segment. The beveled surfaces mate and facilitate angular articulation of the adjoining segments while limiting gaps between the articulating segments.

Desirably the segments are formed of a solvent resistent synthetic resin that is formulated to be especially tough. A nylon material having a toughening additive is preferred. The internal diameter of the segments should be at least three thirty-seconds (3/32) inch greater than the external or outer diameter of the hose. This permits some deformation of the segments when subjected to a crushing load without damaging the hose and it also facilitates articulation of the hose jacket and hose without deforming the hose. A difference in diameter of at least one-eighth (⅛) inch between the internal diameter of the segments and the outer diameter of the hose is preferable.

It is also desirable that the segments be formed of a heat resistant material so that the hose may be protected from hot objects that may be placed on the hose casing. A casing material that can withstand at least about nineteen hundred (1900) BTU's without melting is desirable.

A protected hose incorporating the present hose jacket includes fixed position fittings at the ends of the hose in order to retain the segments in closely spaced relationship on the hose.

A method of protecting an existing hose from external damages comprises removal of an existing fitting on the hose, inserting a series of segments on the hose and then reinstalling a fitting on the end of the hose. The fitting can be a conventional connector fitting at the end of the hose. One or more shorter segments can be employed in order to achieve a close spacing of the segments between the fittings.

These and other features of the present invention will hereinafter appear, and for purposes of illustration, but not of limitation, a detailed description of a preferred embodiment of the present invention is shown and described below.

BRIEF DESCRIPTION OF THE DRAWINGS

FIG. 1 is pictorial view showing the manner in which the hose jacket of the present protects a fluid hose from being crushed by a vehicle tire.

FIG. 2 discloses the invention of FIG. 1 wherein a compression spring jacket tightener is positioned at the end of the hose segment in order to maintain the hose jacket segments in closely spaced relationship.

FIG. 3 is a cross-sectional view showing a section of hose and hose jacket that has been bent.

FIG. 4 is a cross-sectional view showing the junction between two adjacent hose jacket segments.

FIG. 5 is a view similar to FIG. 4 wherein the ends of the segments are beveled in an arcuate shape instead of a conical shape.

FIG. 6 is a view of a section of hose and hose jacket showing use of color coded segments in the hose jacket.

DETAILED DESCRIPTION OF THE PREFERRED EMBODIMENT

Referring now to the drawings, a hose jacket 10 constructed in accordance with the present invention is shown in FIG. 1 mounted on a flexible fluid hose 12. The hose and hose jacket in FIG. 1 are being shown as they would be subjected to a crushing force provided by a tire 15 of a forklift truck or the like.

Hose 12 is a conventional fluid hose. These can be made of a variety of materials and sizes and can be used for various purposes, including conveying compressed air, acetylene, hydraulic fluid, or oxygen. A five-eighths (⅝) inch outer diameter rubber hose seems to be the most popular size of hose used in industrial applications, but one (1) and one-half (½) inch hoses are common. Hose sections typically are interconnected by hose fittings 14 that are clamped or crimped on the end of the hose section. The action of crimping a fitting on the end of a hose section produces a pair of flanges 16 that extend outwardly from the crimped portion 18 of the fitting. The fittings include connector fittings at the ends. These can be threaded connectors 20 of the type shown in FIG. 3 or they can be quick disconnect fittings. The hose connectors or fittings are conventional.

As shown in FIGS. 3 and 4, hose jacket 10 comprises a series of individual tubular segments 22 that are arranged in end-to-end relationship on hose 12. When retrofitting an existing hose, a hose fitting 14 at one end of the hose is removed and the tubular segments are inserted on the hose. The hose fitting is then reinstalled on the end of the hose. The hose fittings hold the tubular segments on the hose, and a proper number of tubular segments are inserted on the hose in order to maintain a reasonably close axial spacing of the tubular segments on the hose.

Each tubular segment is formed of a tough, crush resistant material, preferably a plastic resin composite material. Desirably the resin is tough enough to resist crushing forces exerted by a forklift truck or the like. Other desirable features of the tubular segments are that they resist solvents and gasoline and are temperature resistant so that hot metals or the like placed on the hose jacket will not be transmitted through to the hose and will not destroy the hose jacket. It is desirable that these segments be able to withstand an application of nineteen hundred (1900) BTU's against the hose jacket or more without damaging the hose jacket.

A desirable material for fabricating hose jacket segments is a crystalline plastic resin reinforced with a toughening substance. A particular DuPont formulation that has been found to be satisfactory is sold as "Nylon 66 Zytel 42" ("Zytel"). This product includes a toughening additive that increases the crush resistance of the product. Zytel has great strength, good memory characteristics (it returns to its original shape after being crushed) and heat resistance (it sheds molten metal without melting the segments).

The size and shape of the tubular segments will vary in accordance with the compression needs and the size and type of the hose that is being encased. However, for a conventional five-eighths (⅝) inch O.D. hose, the preferred tubular segments have a three-quarter (¾) inch inner diameter ("I.D.") and a one (1) inch outer diameter ("O.D."), thus providing a wall thickness of approximately one-eighth (⅛) inch. As the hose diameter is increased, an increased wall thickness for the tubular sections becomes necessary. There should be at least a one-sixteenth (1/16) inch clearance between the hose and the interior walls of the tubular sections.

For most applications, tubular segments two (2) inches long provide sufficient articulation for the hose. Partial segments 23 of one (1) inch or so may be necessary to provide a sufficiently close spacing of the segments between hose fittings at each end of the hose. It is not necessary and usually is not desirable that the tubular segments be tightly clamped together, as this would restrict the ability of the hose jacket to be articulated by angular movement.

An important feature of the tubular segments of the present invention is that the ends of the tubular segments are tapered or beveled, with each tubular segment having an externally beveled surface 24 at one end and an internally beveled surface 26 at the other end. The beveled shapes for the internal and external surfaces desirably are the same so that the beveled surfaces mate in the manner shown in FIGS. 4 and 5.

As shown in FIG. 4, the beveled surfaces 24 and 25 at the ends of the segments can be conical in shape. Alternatively, as shown in FIG. 5, the beveled surfaces 25 and 27 can describe an arc. Referring to FIG. 3, a hose bent through an increasing radius of curvature is illustrated. Segment 22a and 22b at the left hand end of the hose (FIG. 3 orientation) are bent slightly. The internal beveled surface at the bottom (or inner diameter of the arc) starts to slide over the external beveled surface on the inner side of segment 22a. At the same time, the beveled surfaces at the outer side of the arc start to slide apart, although they are still in contact for the arc shown between segments 22a and 22b.

Referring to the junction between segments 22b and 22c, the arc is a sharper radius. The internally beveled surface on the inner side of segment 22c has slid further over the inner side of segment 22b and the beveled surfaces at the outer side of the arc have slid to a position where they are just separating. The junctions between segments 22a and 22b and between 22b and 22c still have virtually no gap between the segments for the arcs shown in FIG. 3. The hose is bent at even a smaller radius arc at the junction between segments 22c and 22d. As shown in FIG. 3, a slight gap exists at the junction between the outer sides of segments 22c and 22d. Because of the substantial overlap of the inner sides of these segments, however, the gap is much less than would exist if the ends of the segments were at right angles to each other.

Another advantage produced by the beveled ends of the tubular segments is that when the tubular segments are bent through a prescribed arc, the partial overlapping of the tubular segments, particularly at the inner surface of the arc, minimizes the extent to which the tubular segments tend to stretch the hose as the tubular segments are bent. The extent to which articulation is possible can be increased somewhat by providing more space between the individual tubular segments on the hose. It is not necessary that the hose segments be tightly compressed together, because in most cases, the tubular segments are intended to resist crushing forces provided by a tire or other object having a significant width, so slight gaps between the tubular segments are not detrimental to performance of the product.

As shown in FIG. 2, the tubular segments can be held resiliently together on the hoses by means of a compression spring 28 mounted between the end segment 22e and the fitting 14 at the end of the hose. This spring can be compressed in order to provide a full range of articulation of the hose but the hose segments are pressed together when they are not articulated.

Regardless of whether a compression spring is used or not, it is desired that the segments be loosely enough spaced on the exemplary hose that the hose can be bent into an arc having a radius such that a ten (10) foot tube can be bent into a circle without collapsing the tube. This corresponds to an arc of curvature having a radius of approximately one and one-half (1½) feet. This gives the tube plenty of flexibility without having so much space between the segments that there is a substantial risk of penetration of the tube between the segments. With the present invention, the hose can actually be bent into a tighter arc. A four (4) foot length of hose with segments attached can be bent into a circle.

The ability of the segments to articulate without compressing the hose is determined by the diameter of the segments with respect to the hose, the angle of the taper at the ends of the segments and the tightness with which the segments are pressed together. Desirably, the segments should be formed so that two segments in end-to-end relationship can be pivoted about six degrees (6°) with respect to each other without producing a significant gap between the segments or stretching the hose.

In the preferred practice of the present invention, the taper at the ends of the segments should be about thirty to sixty degrees (30°-60°) and desirably about forty-five degrees (45°) with respect to the axis of the segment. A slightly radiused end of the segments also is desirable.

Another characteristic of the hose jacket is that the tubular segments should have the ability to withstand a collapsing force of fourteen thousand (14,000) pounds exerted directly on the sides of the segments. This collapsing force is spread over the length of a two (2) inch segment.

Another feature of the present invention is that the segments can be color coded to indicate the nature of the fluid being conveyed by the hose. Desirably every third segment is color coded to indicate compressed air (blue), acetylene (red), hydraulic fluid (black) or oxygen (green). Because the individual segments are not physically interconnected but are only juxtaposed next to each other, it is easy to replace color coded segments with new color coded segments in the event that the jacket is to be used for a hose conveying a different type of fluid.

To install the hose jacket on an existing hose, a fitting at the end of the hose is cut off and the tubular segments are inserted on the hose from that end. If necessary, a shorter hose segment of one (1) inch may be inserted to provide the necessary spacing between the tubular segments. A new hose fitting is then crimped on the end of the hose after the hose jacket has been installed.

The hose jacket of the present invention provides a simple, inexpensive means for protecting a flexible fluid hose from external forces such as crushing or puncture or the like while still permitting articulation of the hose. The present invention does not limit hose articulation to any particular angle or degree or any other use or function of the hose but it merely protects the hose against external damages. It also protects the hose against heat damage and chemical splashes.

The foregoing is merely representative of the preferred embodiment of the present invention. Various modifications and changes may be made in the arrangements and details of construction of the embodiment disclosed herein without departing from the spirit and scope of the present invention, as defined in the appended claims.

I claim:

1. A hose jacket for protecting a flexible resilient fluid conveying hose from external damage or crushing, the hose jacket comprising a plurality of separate tubular segments of generally uniform diameter that fit over the hose in end-to-end fashion, the tubular segments being formed of a tough, crush resistant nylon material that restrains the hose from damage when a forklift truck drives over the hose jacket, the jacket resiliently resisting deflection under the weight of a fork lift truck and having sufficient memory to substantially return to its original shape after the weight of the fork lift truck is removed, the tubular segments being retained in a closely spaced relationship on the hose by fixed position fittings mounted on the hose at opposite ends of the hose jacket, the fittings restraining the segments from sliding past the fittings, the tubular segments having an external beveled surface at one end thereof and an internal beveled surface at an opposite end thereof, the segments being positioned on the hose with the external beveled surface of one segment abutting an internal beveled surface of the adjoining segment, the beveled surfaces mating and facilitating angular articulation of the hose and hose jacket while limiting open gaps between articulated segments, the segments being shaped and sized such that they fit loosely over the hose and do not interlock together, the segments being individually rotatable on the hose.

2. A hose jacket according to claim 1, wherein the inside diameter of the segments is at least one-eighth (⅛) inch greater than the outside diameter of the hose so as to permit some articulation of the segments and some flattening of the segments under load without deflecting the hose to a closed condition.

3. A hose jacket according to claim 1, wherein the fittings on the hose are threaded fittings mounted at the ends of the hose.

4. A hose jacket according to claim 2, wherein the resin comprises Zytel nylon having a wall thickness of at least about one-eighth (⅛) of an inch.

5. A hose jacket according to claim 1, wherein the segments and the beveled surfaces thereon are formed so as to permit angular articulation of an enclosed hose having a diameter of five-eighths (⅝) inches or less into an arc having a radius of as little as about one and one-half (1½) feet without the hose jacket collapsing the hose.

6. A hose jacket according to claim 1, wherein the beveled surfaces are beveled at an angle of thirty to sixty degrees (30°-60°) with respect to the axial wall of the segment.

7. A hose jacket according to claim 1, wherein the segments are up to about two (2) inches long and are formed to permit angular articulation of a hose having a diameter of five-eighths (⅝) inches or less with attached hose jacket into a radius of as little as about one and one-half (1½) feet without collapsing or damaging the hose.

8. A hose jacket according to claim 7, wherein most of the segments are a uniform length of about two (2) inches but some segments are shorter so as to provide a closer fit of segments on a given length of hose.

9. A hose jacket according to claim 1, wherein at least certain of the segments are color coded to indicate the nature of the fluid conveyed by the hose.

10. A crush-resistant hose for conveying fluids comprising:
a flexible hose formed of a flexibly crushable tubular material of a type suitable for conveying fluids;
a crush-resistant jacket surrounding at least a portion of the hose, the jacket comprising a plurality of tubular segments formed of tough, crush resistant synthetic resin material and being closely spaced in end-to-end relationship on the hose, the tubular segments each having an outwardly beveled surface at one end and an inwardly beveled surface at the other end, the segments being arranged so that inwardly and outwardly beveled surfaces on adjoining segments mate, the beveled surfaces facilitating angular articulation of the hose and hose jacket without producing wide gaps between the ends of articulating segments; and fixed position fittings on the hose at opposite ends of the hose jacket, the fittings holding the segments in a closely spaced relationship on the hose.

11. A crush-resistant hose according to claim 10, wherein the inside diameter of the segments is at least one-eighth (⅛) inch greater than the outside diameter of the hose so as to permit some articulation of the segments and some flattening of the segments under load without deflecting the hose to a closed condition.

12. A crush-resistant hose according to claim 10, wherein the resin comprises nylon.

13. A crush-resistant hose according to claim 10, wherein the segments are up to about two (2) inches long and are formed to permit angular articulation of a hose having a diameter of five-eighths (⅝) inches or less with attached hose jacket into a radius of as little as about one and one-half (1½) feet without collapsing or damaging the hose.

14. A process for protecting a flexible fluid conveying hose from external damage from crushing or puncture wherein the hose has connection fittings attached to the ends thereof, comprising:

removing one of the fittings from one end of the hose;

installing over the one end thereof a series of relatively short tubular segments of generally uniform diameter and formed of a tough, crush resistant plastic resin, the segments each having an internally tapered end and an externally tapered end and being arranged such that the externally tapered end of one segment is positioned opposite the internally tapered end of the adjacent segment, the tapered ends mating and facilitating articulation of the hose and segments without producing wide gaps of exposed hose between the articulated segments, the segments being installed on the hose until they substantially fill the space between the ends of the hose; and affixing a hose connector fitting on the one end of the hose, the fittings being large enough and the segments being small enough such that the fittings retain the segments on the hose between the fittings.

* * * * *